United States Patent
Samra et al.

(10) Patent No.: US 9,024,967 B2
(45) Date of Patent: May 5, 2015

(54) DIGITAL VIDEO EDITING SYSTEM INCLUDING MULTIPLE VIEWING WINDOWS OF A SAME IMAGE

(75) Inventors: Sukendeep Samra, Venice, CA (US); Makoto Kawamura, Tokyo (JP); Shingo Kawabe, Marina del Rey, CA (US); Kyoko Nakamura, Marina del Rey, CA (US)

(73) Assignees: Sony Corporation, Tokyo (JP); Sony Electronics Inc., Parkridge, NJ (US)

( * ) Notice: Subject to any disclaimer, the term of this patent is extended or adjusted under 35 U.S.C. 154(b) by 61 days.

(21) Appl. No.: 13/298,604

(22) Filed: Nov. 17, 2011

(65) Prior Publication Data

US 2012/0294589 A1 Nov. 22, 2012

Related U.S. Application Data (63) Continuation of application No. 09/930,115, filed on Aug. 14, 2001, now Pat. No. 8,830,272.

(60) Provisional application No. 60/271,376, filed on Feb. 22, 2001, provisional application No. 60/284,660, filed on Apr. 17, 2001.

(51) Int. Cl.
  *G09G 5/00* (2006.01)
  *G06F 17/24* (2006.01)
  *G11B 27/031* (2006.01)
  *G11B 27/034* (2006.01)
  *G11B 27/34* (2006.01)

(52) U.S. Cl.
  CPC ............ *G06F 17/241* (2013.01); *G11B 27/031* (2013.01); *G11B 27/034* (2013.01); *G11B 27/34* (2013.01)

(58) Field of Classification Search
  CPC .................. G06T 2200/24; G06F 2203/04806
  See application file for complete search history.

(56) References Cited

U.S. PATENT DOCUMENTS

| | | | |
|---|---|---|---|
| 4,482,924 A | 11/1984 | Brownstein |
| 4,532,605 A | 7/1985 | Waller |
| 4,538,188 A | 8/1985 | Barker |
| 4,751,507 A | 6/1988 | Hama |

(Continued)

OTHER PUBLICATIONS

Piroumian, Vartan, "Java GUI Development: The Authoritative Solution", Aug. 25, 1999, Sams, pp. 208, 217, 220.*

(Continued)

*Primary Examiner* — Hau Nguyen
*Assistant Examiner* — Ryan M Gray
(74) *Attorney, Agent, or Firm* — Trellis IP Law Group, PC (57) ABSTRACT

The system provides different ways for users to select an object and an action to be applied to the object in computer applications such as image processing or digital post-production. The user can select an object first and then an action, or vice versa. The user can also use gestural input to designate both an object and action virtually simultaneously. Multiple view, or windows, of an image can be independently sized, zoomed, panned, etc. Any effects performed on the image appear in all of the windows since each window shows (potentially) different portions of the same image content. A navigation window helps a user move within a large image or diagram that does not fit entirely on a single display screen. The navigation window includes an inner box that shows, in miniature, the principal objects in the screen display.

19 Claims, 10 Drawing Sheets

(56) References Cited

U.S. PATENT DOCUMENTS

| | | | | |
|---|---|---|---|---|
| 4,831,447 | A | 5/1989 | Lake | |
| 4,953,106 | A | 8/1990 | Gansner | |
| 5,187,776 | A | 2/1993 | Yanker | |
| 5,237,648 | A | 8/1993 | Mills | |
| 5,253,338 | A | 10/1993 | Tanaka | |
| 5,263,134 | A | 11/1993 | Paal | |
| 5,404,295 | A | 4/1995 | Katz | |
| 5,438,654 | A | 8/1995 | Drebin | |
| 5,490,246 | A | 2/1996 | Brotsky | |
| 5,513,306 | A | 4/1996 | Mills | |
| 5,517,607 | A | 5/1996 | Nishimura | |
| 5,600,775 | A | 2/1997 | King | |
| 5,729,673 | A | 3/1998 | Cooper | |
| 5,760,767 | A | 6/1998 | Shore | |
| 5,771,042 | A * | 6/1998 | Santos-Gomez | 715/800 |
| 5,844,563 | A | 12/1998 | Harada | |
| 5,850,545 | A | 12/1998 | Matsushita | |
| 5,852,449 | A | 12/1998 | Esslinger | |
| 5,864,782 | A | 1/1999 | Mederer | |
| 5,870,559 | A | 2/1999 | Leshem | |
| 5,880,858 | A | 3/1999 | Jin | |
| 5,890,130 | A | 3/1999 | Cox | |
| 5,909,220 | A * | 6/1999 | Sandow | 345/589 |
| 5,920,317 | A | 7/1999 | McDonald | |
| 5,930,446 | A | 7/1999 | Kanda | |
| 5,982,350 | A * | 11/1999 | Hekmatpour et al. | 345/629 |
| 6,005,535 | A | 12/1999 | Takagi | |
| 6,046,722 | A | 4/2000 | Keil | |
| 6,085,185 | A | 7/2000 | Matsusawa | |
| 6,105,063 | A | 8/2000 | Hayes | |
| 6,204,840 | B1 | 3/2001 | Petelycky | |
| 6,229,536 | B1 | 5/2001 | Alexander | |
| 6,263,346 | B1 | 7/2001 | Rodriquez | |
| 6,266,053 | B1 | 7/2001 | French | |
| 6,307,550 | B1 | 10/2001 | Chen | |
| 6,340,971 | B1 | 1/2002 | Janse | |
| 6,392,674 | B1 | 5/2002 | Hiraki | |
| 6,404,925 | B1 | 6/2002 | Foote | |
| 6,430,609 | B1 | 8/2002 | Dewhurst | |
| 6,449,653 | B2 | 9/2002 | Klemets | |
| 6,452,615 | B1 | 9/2002 | Chiu | |
| 6,467,080 | B1 | 10/2002 | Devine | |
| 6,470,100 | B2 | 10/2002 | Horiuchi | |
| 6,529,215 | B2 | 3/2003 | Golovchinsky | |
| 6,587,123 | B2 | 7/2003 | Ando | |
| 6,590,583 | B2 | 7/2003 | Soohoo | |
| 6,597,375 | B1 | 7/2003 | Yawitz | |
| 6,683,619 | B1 | 1/2004 | Samra | |
| 6,694,487 | B1 * | 2/2004 | Ilsar | 715/247 |
| 6,750,890 | B1 | 6/2004 | Sugimoto | |
| 6,873,344 | B2 | 3/2005 | Samra | |
| 6,897,880 | B2 | 5/2005 | Samra | |
| 7,075,536 | B1 | 7/2006 | Goldschmidt | |
| 7,129,961 | B1 | 10/2006 | Samra | |
| 7,930,418 | B2 | 4/2011 | Samra | |
| 2002/0032768 | A1 | 3/2002 | Voskuil | |
| 2002/0033837 | A1 * | 3/2002 | Munro | 345/654 |
| 2002/0158887 | A1 | 10/2002 | Samra | |
| 2003/0001844 | A1 | 1/2003 | Driemeyer | |
| 2004/0068567 | A1 | 4/2004 | Moran | |
| 2004/0078215 | A1 | 4/2004 | Dahlin | |

OTHER PUBLICATIONS

Nadas et al.; Grape: An Enviroment to Build Display Process; Jul. 1987; ACM; Computer Graphics; vol. 21; No. 4; pp. 75-84.

* cited by examiner

DIGITAL VIDEO EDITING SYSTEM INCLUDING MULTIPLE VIEWING WINDOWS OF A SAME IMAGE

This application is a continuation of the following application, U.S. patent application Ser. No. 09/930,115, entitled USER INTERFACE FOR A DIGITAL PRODUCTION SYSTEM INCLUDING MULTIPLE WINDOW VIEWING AND NAVIGATING, filed on Aug. 14, 2001, which is hereby incorporated by reference, as if it is set forth in full in this specification.

This application claims priority from the following U.S. Provisional patent applications:

1. Application Ser. No. 60/271,376; filed Feb. 22, 2001, entitled "A System and Method for Editing"; and
2. Application Ser. No. 60/284,660; filed Apr. 17, 2001, entitled "Advanced System and Method for Editing".

CROSS-REFERENCE TO RELATED APPLICATIONS

This application is related to the following co-pending U.S. patent applications:

1. application Ser. No. 09/665,721; filed Sep. 18, 2000, entitled "System And Method For Optimizing The Processing Of Images";
2. application Ser. No. 09/691,795; filed Oct. 18, 2000, "System And Method For Increasing Performance When Compositing Images";
3. application Ser. No. 09/929,276; filed Sep. 13, 2001, entitled "User Interface for Generating Parameter Values in Media Presentations Based on Selected Presentation Instances";
4. application Ser. No. 09/929,526; filed Aug. 13, 2001, entitled "Collaborative Computer-Based Production System Including Annotation, Versioning and Remote Interaction"; and,
5. application Ser. No. 09/929,400; filed Aug. 13, 2001, entitled "Media Production System Using Flowgraph Representation of Operations";

BACKGROUND OF THE INVENTION

This invention relates in general to digital processing systems and more specifically to a digital processing system using a graphical representation of operations to advantageously accomplish processing of digital media productions.

Today's digital processing systems are used in many applications. One intensive application area uses digital production systems to create and process movies, video, animation, audio and other types of digital media. Such systems are referred to as production systems.

The demand on a production system is extremely high. A huge amount of information is present in even a few frames (less than one second) of a visual production, such as a movie. The type and number of possible complex operations that can performed on a movie require enormous processing power. Production systems provide incredible flexibility in applying different operations such as effects, transitions, editing, adjustments and other modifications. Each of dozens, or more, types of operations may in themselves have many different parameters, or other characteristics, which can be modified. The selection and application of operations on hundreds of selected areas of frames, clips and other parts of a production has become a highly specialized and complex task.

For example, a typical operation may be to composite two images together. The decision to perform a composite operation leads a human user of a production system down a path of myriad choices such as selecting frames or clips for compositing, cropping and scaling the images, performing color correction, erosion, blurring, light balancing, creating masks, etc. Several sets of operations may be required for different portions within a single frame, or screen area of a clip.

In present systems, the user interface (i.e., the display and user input devices) of productions systems is of great importance. Any improvement in ease of use and efficiency is often realizes a huge benefit in decreasing production times and providing better production results. However, the design of such user interfaces is difficult because the production system is usually limited to a relatively small display area (e.g., 1 or two display screens) to both display and play back the media, and to provide controls for navigating among thousands or production parts and for applying the complex operations.

Thus, it is desirable to provide an invention that improves upon the prior art user interfaces in production systems.

BRIEF SUMMARY OF THE INVENTION

The present invention provides viewing features for an applications program such as a digital image processing program, non-linear editor, post-production system, etc. One aspect of the invention provides different ways for users to select an object and an action to be applied to the object. The user can select an object first and then an action, or vice versa. The user can also use gestural input to designate both an object and action virtually simultaneously.

Another aspect of the invention provides multiple views of a same image. Each view, or window, can be independently sized, zoomed, panned, etc. Any effects performed on the image appear in all of the windows since each window shows (potentially) different portions of the same image content.

Another aspect of the invention provides a navigation window to help a user move within a large image or diagram that does not fit entirely on a single display screen. The navigation window includes an inner box that shows, in miniature, the principal objects in the screen display. A region outside of the screen display is shown in the navigation box, relative to the inner box.

Another aspect of the invention derives an active area from multiple operations mark in/out points. Operations that are part of a group have their in/out points adjusted so that the operation does not occur outside of the group's own mark in/out points.

In one embodiment the invention provides a method for performing actions on objects, the method executing in a computer system including a processor coupled to a user input device, the method comprising accepting signals from a user input device to first specify a first object and then select a first action to be performed on the first object; accepting signals from a user input device to first select a second action and then specify a second object on which the second action is to be performed; and accepting signals from a user input device to define a gesture that overlaps a third object, wherein the gesture is mapped to a third action to be performed on the third object.

In another embodiment the invention provides a method for displaying images on a display screen, the method comprising displaying multiple windows on the display screen; performing an operation on an image;

displaying the image in each of the multiple windows; and accepting input from a user input device to allow independent manipulation of the windows.

In another embodiment the invention provides a method for viewing an image on a display screen, wherein the display screen is coupled to a processor and user input device, the method comprising displaying a navigator box on the display screen; displaying a miniature version of the image on the display screen within an inner box within the navigator box on the display screen, wherein the inner box is smaller than the navigator box, wherein portions of the image not displayed on the display screen are shown in miniature within the area of the navigator box that is outside of the inner box.

In another embodiment the invention provides a method for determining active intervals of operations to be performed on images, wherein each operation includes a start time and a stop time that defines an initial active interval for the operation, the method comprising selecting one or more operations to be members of a group; determining a start time and a stop time to define a group interval for the group; and setting the active region of each operation that is a member of the group to be the intersection of each operation's initial active interval with the group interval.

The present invention provides features whereby image content in a media production system is associated with a visual flowgraph representation of the operations used to create, or derive, the image content. A comprehensive association is maintained between production parts in image space and in flowgraph space. This allows a user to quickly move between working with an image representation of a part and the flowgraph (i.e., visual display of operations) representation.

DETAILED DESCRIPTION OF THE INVENTION

A specific, preferred embodiment, production system is referred to as "Socratto" which is developed and marketed by VFX, a division of Sony Corporation. Although aspects of the present invention are described in connection with the Socratto system, it should be apparent that the invention is suitable for use with many different productions systems having different ways to present information and to accept user inputs. Also, although the invention is described herein primarily with reference to film or video production systems, the invention is applicable to other types of media production systems such as computer-aided design, audio, animation, modeling, etc. Various aspects of the invention are applicable to any type of application program or functional system.

Figure 1A:
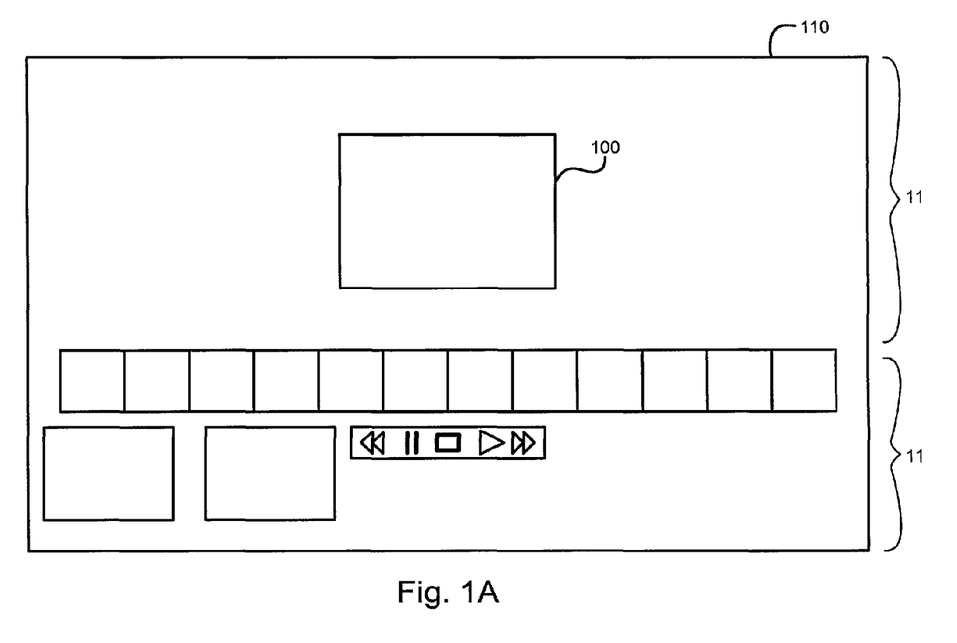
FIG. 1A shows a first screen display of the user interface of the present invention.

FIG. 1A shows a first screen display of the user interface.

In FIG. 1A, display screen 110 is used to display first panel area 116 and second panel area 114. In the preferred embodiment, first panel area is used to display images, clips and a "flowgraph" diagram depending on the current activity of the user. Second panel area 114 includes user interface controls that can change, as needed, in accordance with the display and operation of the first panel area. The preferred embodiment of the invention uses the lower panel as the primary control area so that the more substantial portion of the display screen defined by the first panel is available for frame and clip playback and for display of flowgraphs (which can become complex). Naturally, any arrangement of panels, orientation of display areas and controls, or other use of one or more display screens to effect a user interface display is possible.

Figure 1B:
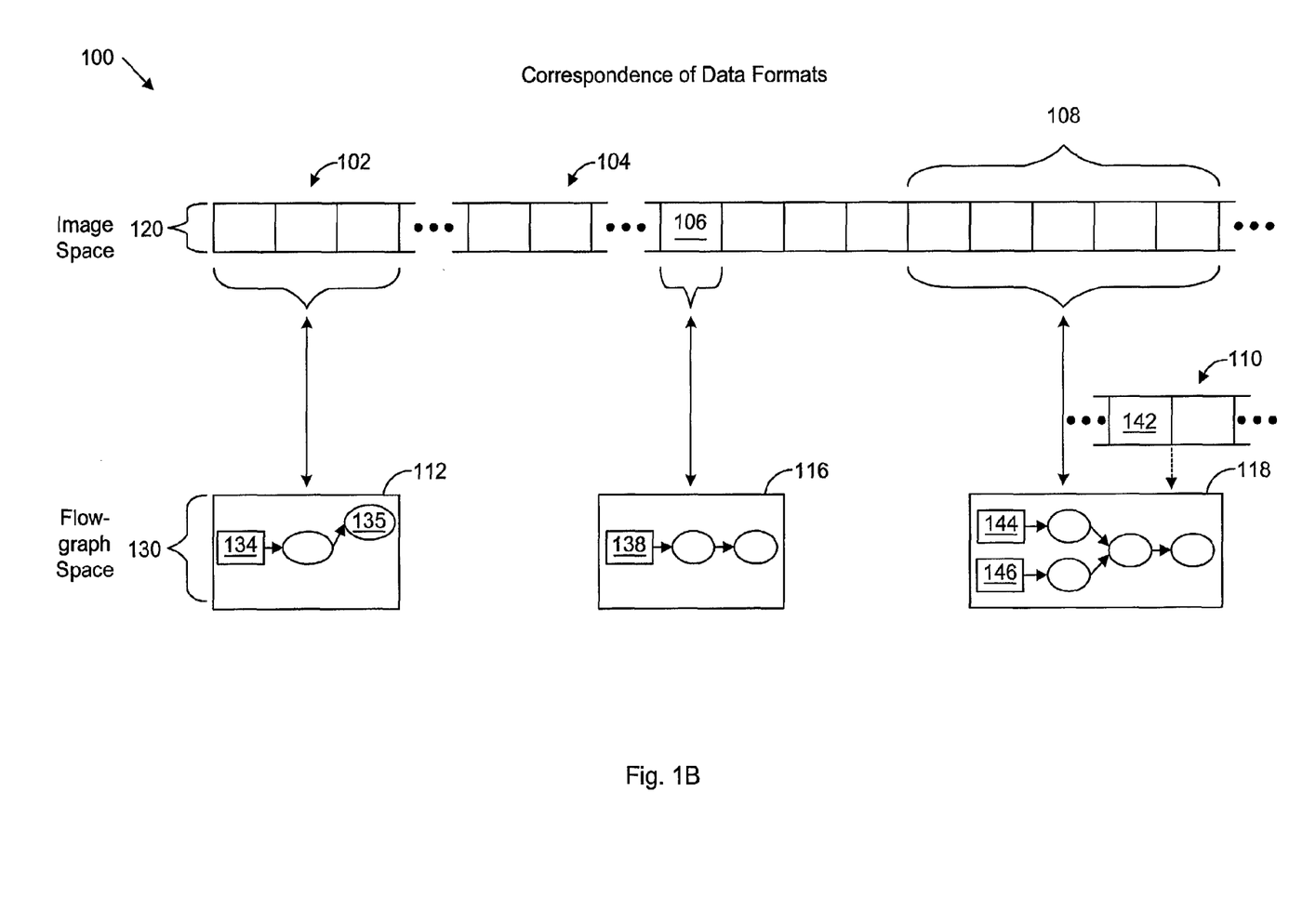
FIG. 1B illustrates the correspondence of flowgraph representations to image representations.

FIG. 1B illustrates the correspondence of flowgraph representations to image representations.

In FIG. 1B, image space 120 is a conceptual category that includes visual presentation of images. Such images can be bitmap, vector representation, photographic projection or other type of digital or non-digital data formats. Image space is useful to present a large amount of visual information to a human user, as where a frame is displayed or a clip is played back. Because of the innate ability of humans to process very large amounts of visual information almost instantaneously, image space representation is an efficient and important way for users to, e.g., compare image results, predict anticipated changes and necessary operations, determine when a desired result is achieved, etc. Further, image space representation is the ultimate form that a completed production assumes.

Frames, or images, such as frame 132, 136 and 140 exist in image space. Clips typically include multiple frames and also exist in image space. Clips 102, 104 and 110 are shown in FIG. 1B. Clip section 108 is also shown, along with other frames and clip portions, not referenced. In a preferred embodiment, groups of clips and frames can be organized into a "reel." The frames and clips in FIG. 1B can be considered part of a single reel, but any type of organization is possible. In general, although reference is made to specific types of production parts such as frames, images, clips, clip sections, frame layers, etc., any production part, group of parts, or portion of a part can be included.

Flowgraph space 130 is a second conceptual category that includes a visual presentation of operations that are performed to generate a production part. In a preferred embodiment, flowgraphs are associated with clips or clip sections (including single frames or portions of frames). The associations can be one-to-one, one-to-many or many-to-one; although a preferred embodiment maintains a one-to-one relationship between each unique clip section and the flowgraph that generated it. Any manner of correspondence or associations among production parts and clips are possible.

In FIG. 1B, flowgraph 112 is associated with clip 102. Clip 104 does not have a flowgraph associated with it. Frame 106 is associated with flowgraph 116. Clip section 108 is associated with flowgraph 118. Clip 110 is not associated with flowgraph 118 since clip 110 is merely used as an input to create clip 108, as discussed, below.

Each flowgraph's associated part represents the output of the operations that the flowgraph describes. For example, In FIG. 1B, flowgraph 112 starts with clip 134 and performs operations on the clip as represented by the oval nodes and connectors of the flowgraph. Flowgraph diagrams are discussed in more detail, below. The output of flowgraph 112 is represented in flowgraph space as node 135 of flowgraph 112. The output is represented in image space as clip 102. The input clip 134 can be any type of part, as can the resulting output. In other words, a single frame can be used to generate multiple frames, a frame portion or layer can be used to generate a full frame, clip, etc.

Flowgraph 116 illustrates the case where the output of a flowgraph, namely flowgraph 116, is a single frame, frame 106

Flowgraph 118 illustrates the case where two media sources (e.g., from computer RAM, disk storage, a digital network, optical scanning device, etc.) are used to product clip section 108. Clip 110 represents one of the media sources. The other media source is not shown. The dashed arrow indicates that clip 110 is not associated with flowgraph 118 since clip 110 is not generated by flowgraph 118.

The correspondence, or association, of data items between image space and flowgraph space can be by any means as is known in the art. Parts can be stored or represented in any image format. The flowgraphs can be stored or represented as any type of suitable data structure such as a list, relational database elements, etc. The association between images and flowgraphs can be made with pointers, lists, embedding a part with an associated flowgraph in a file, or by any suitable programming or data processing technique.

Figure 1C:
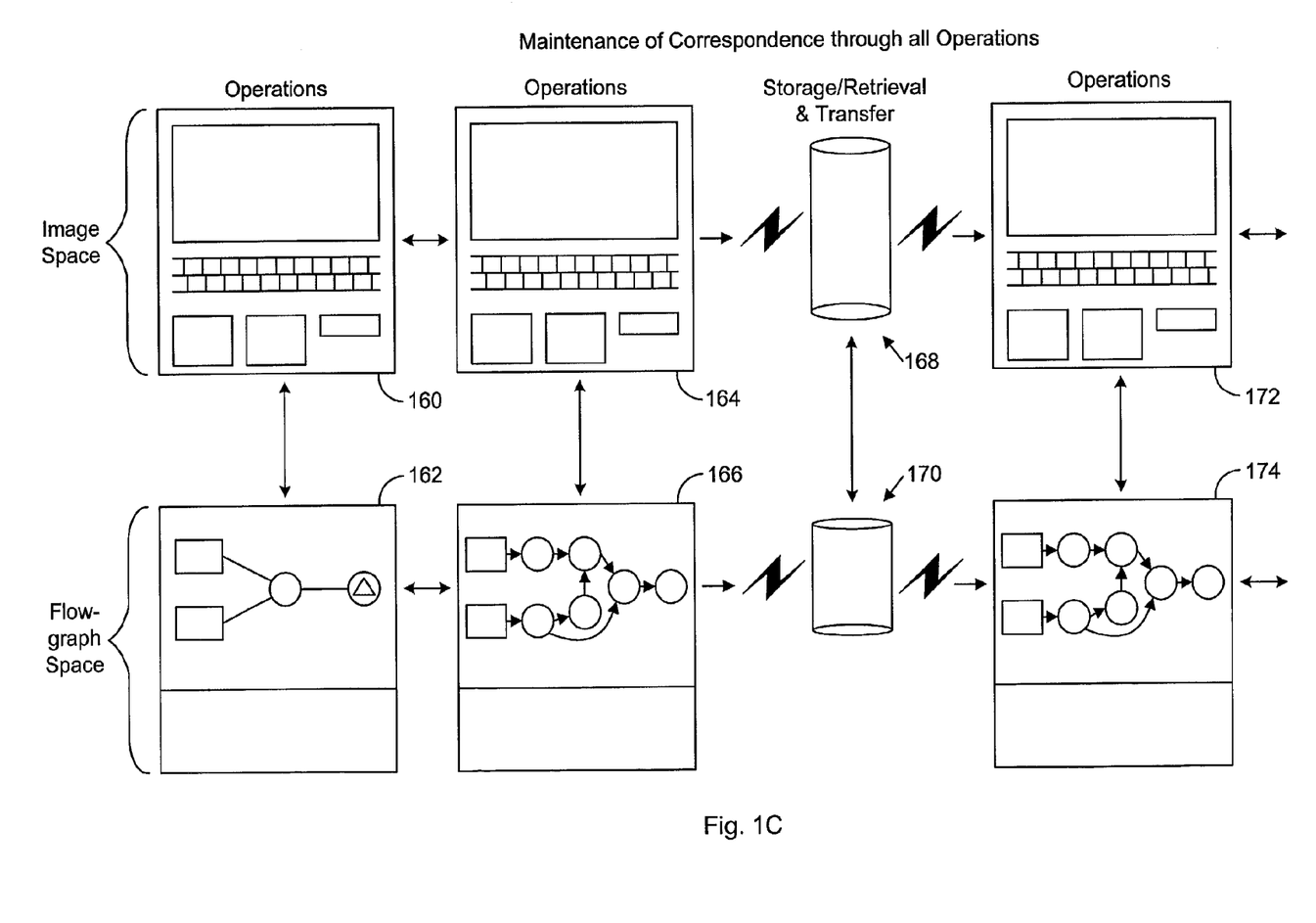
FIG. 1C illustrates the maintenance of correspondence between parts and flowgraphs.

FIG. 1C illustrates the maintenance of correspondence between parts and flowgraphs during any and all types of operations performed in the production system of a preferred embodiment. In a preferred embodiment, there is always a flowgraph counterpart to every production part. Other embodiments need not maintain such a strict rule. However, the insurance of a flowgraph for each part means that a user can easily and instantly switch between viewing and manipulating media in the image space and editing the media in flowgraph space. This achieves a unification of visual presentation of the media with visual presentation of operations used to create the media. As is discussed below, this approach (in concert with other features) provides many benefits.

FIG. 1C shows user interfaces used to perform manipulations to parts in image space. For example, image interface 160 can be used to change the color of an image. The user can then switch to an interface in flowgraph space, represented by flowgraph interface 162, to visually work with the operations. The color change operation is automatically inserted into the flowgraph so that the flowgraph-to-image correspondence is maintained. In a preferred embodiment, every operation that changes a part results in corresponding modifications to the flowgraph associated with the part so that each part always has an up-to-date flowgraph that visually shows the operations used to create or derive the image.

In the course of a typical production, many operations can be made to a part both in image space and in flowgraph space. This is illustrated in FIG. 1C by additional image interface 164 and additional flowgraph interface 166. In the preferred embodiment the user is provided with controls to easily switch back and forth between interfaces in the two spaces.

All types of operations are paralleled. Storage/retrieval and transfer operations are symbolized at 168 and 170. When a part or flowgraph is stored, the associated flowgraph or part, respectively, is also stored in association so another session, program, process, etc., can retrieve the part-flowgraph pair. Note that the two types of representation need not be stored in the same logical or physical area or device. Also, portions of each representation can reside at different location, on different devices, etc., as desired. Similar to storage, when a part or flowgraph is transferred (e.g., over a network to a remote system), the counterpart representation is also made available to the destination.

Retrieval and transfer of a representation pair is illustrated by interfaces 172 and 156.

Thus, the maintenance of closely-linked and continuously updated image and flowgraph pair representations provides advantages in a production system.

Figure 1D:
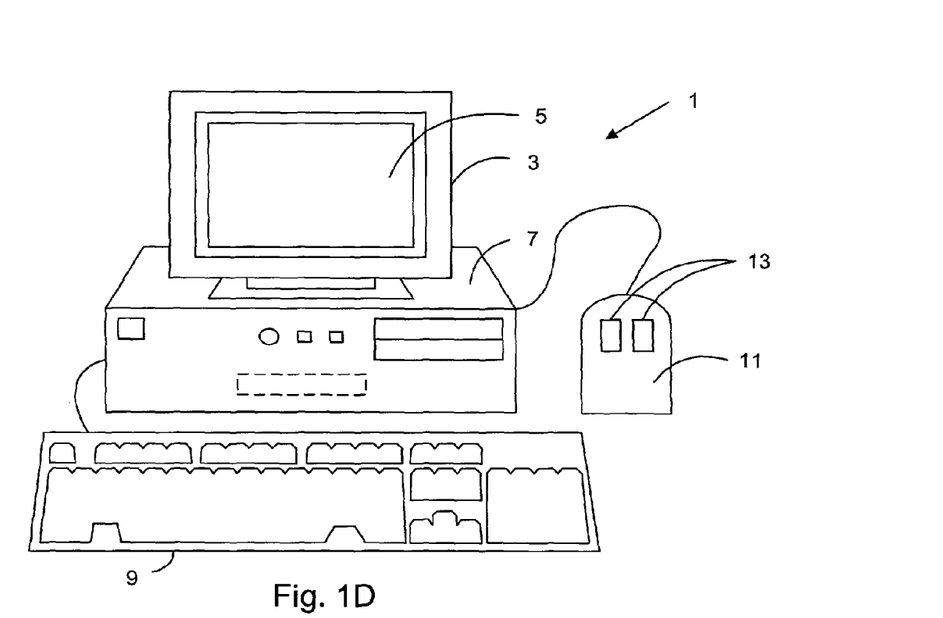
FIG. 1D is an illustration of a computer system suitable for use with the present invention.
Figure 1E:
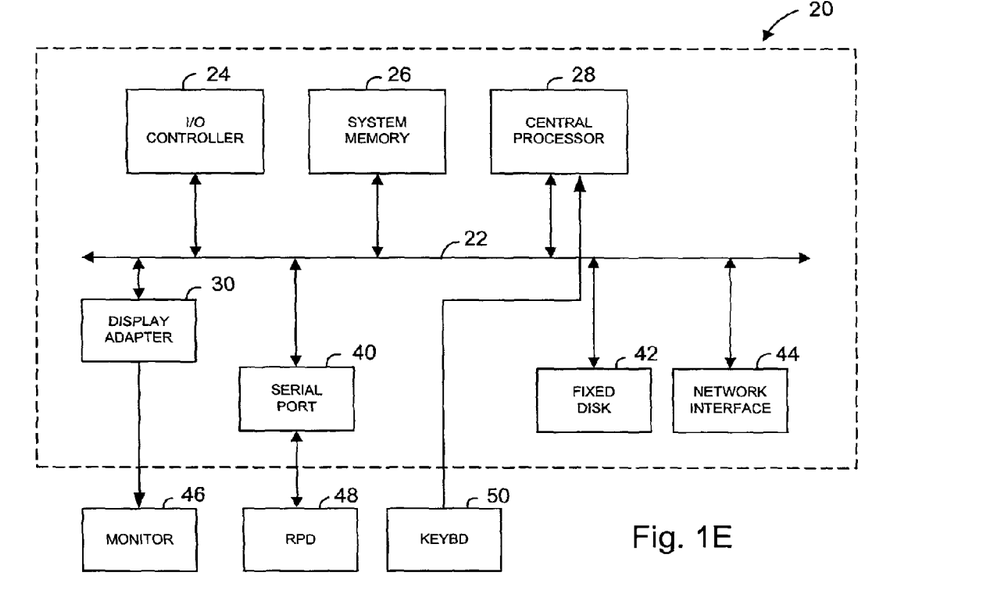
FIG. 1E illustrates subsystems that might typically be found in a computer such as the computer system of FIG. 1D.
Figure 1F:
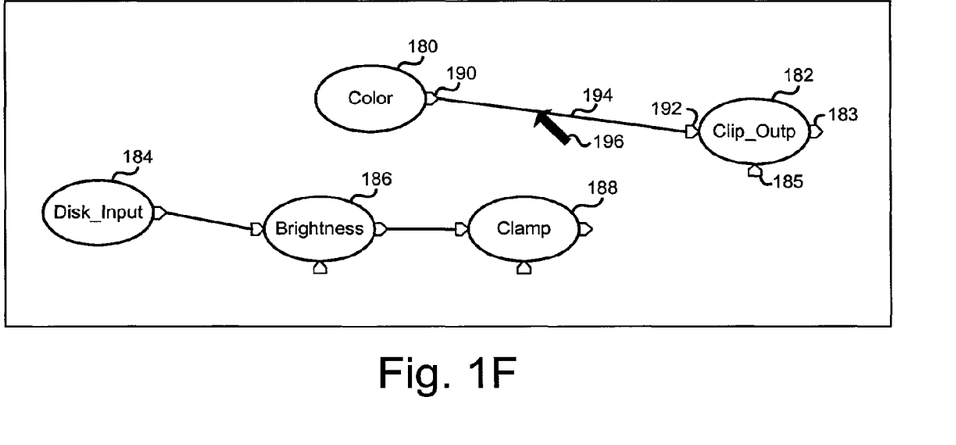
FIG. 1F is an illustration of a flowgraph according to an embodiment of the present invention.

FIG. 1F is an example of a flowgraph according to the present invention.

In FIG. 1F, nodes such as 180, 182, 184, 186 and 188 represent operations. Operations can be effects, filters, processes, actions or any type of action performed on, or with, media content being produced. A list of representative operations is shown in Table I. It should be apparent that many additional types of operations are suitable for use with the present invention.

TABLE I

| | | |
|---|---|---|
| 1. | Brightness Adjustment | control of luminance in RGB and Alpha channels. |
| 2. | Clamp Effect | restricts pixel values within determined ranges. |
| 3. | Contrast | adjusts the range between brightest and darkest tones. |
| 4. | Convert | change pixel types between, e.g., 8 bit, 16 bit floating and working. Can also change image types between RGB, RGBA and Alpha channel outputs. |
| 5. | Crop | allows trimming an image on the left, right, top or bottom. |
| 6. | Dissolve | produces an image that is a mixture of input images. |
| 7. | Fade | produces an image that is a mixture of an input image and a solid color. |
| 8. | Gain | adjusts the brightness of individual channels of a image or clip. |
| 9. | Gamma | adjusts the apparent brightness by altering the middle range of brightness. |
| 10. | Invert | reverses an image's color and shades so that black becomes white, white becomes black, red becomes cyan, etc. |
| 11. | CMY Graph | adjusts the Cyan, Magenta and Yellow channels. |
| 12. | Luma Graph | adjusts the luminance of an image. |
| 13. | Monochrome | converts a color image into a monochrome image by adjusting color saturation in each of the color channels. |
| 14. | Offset | adjusts the brightness of the individual channels of an image. |
| 15. | Swap RGBA | shifts any color channel to become any other color channel. |

Nodes have names that provide brief descriptions, or identifications, of the type of operation represented by the node. For example, node 180 has a name, "Color," indicating that the node is a source for a predefined color output. Output port 190 is an output port for node 180. Connector 194 connects the output of node 180 to node 182 by connecting to node 182's input port 192. Node 182 is called "Clip_Output" which indicates the output of the flowgraph operations. In other words, the flowgraph output is generated at "Clip_Output."

The present invention uses a "user input model" that provides an efficient way for a user to specify an action to be performed on an object. Objects in the system such as frames and clips in image space, or nodes representing effects or other operations in flowgraph space, can have an action applied. For example, an action, such as a color correction operation, can be applied to an object, such as a frame.

The system allows the user to specify object-action processing in three different ways. The first is "object/action" where an object is first identified and then an action is selected to apply to the object. A second type of object-action processing is "action/object" where an action is first selected and then an object to which to apply the action is identified. Finally, "gestural" object-action processing allows choosing an object and action at essentially the same time.

Figure 2A:
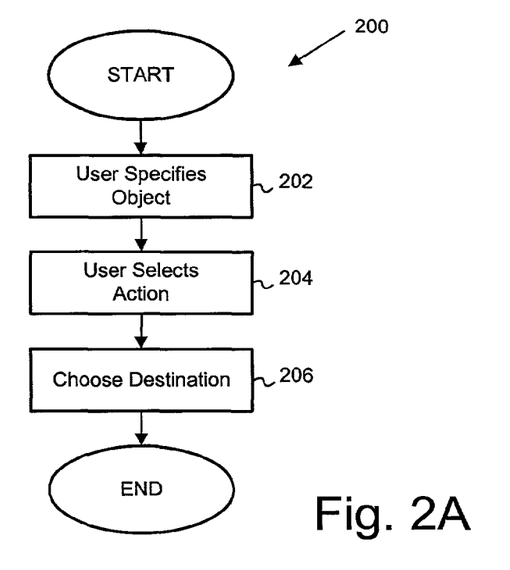
FIG. 2A shows a flowchart illustrating basic steps in a routine to implement object/action processing.

FIG. 2A shows flowchart 200 illustrating basic steps in a routine to implement object/action processing.

After the routine is entered, step 202 is executed to accept user input from an input device to specify an object. The object can be specified by any manner as is known in the art. For example, the object can be "clicked on" with a mouse and pointer, pen tablet, touch screen, trackball and pointer, etc. A pointer can select an object semi-automatically as where a pointer is moved into the vicinity of an object. See, for example, co-pending patent application Ser. No. 09/929,400 filed on Aug. 13, 2001, entitled "Media Production System Using Flowgraph Representation of Operations" referenced, above. The object can be scrolled to the center of the display screen to a "focus" area to become a specified object. The object can be a default object such as some previously specified object that is no longer on-screen. The object can be specified by name, as, for example, where the user types in a name or other identifier for an object. Other ways of specifying an object are possible.

In a preferred embodiment, once a user has specified an object, the object remains highlighted until an action is applied, another object is specified, or the specified object becomes de-specified. Multiple objects can be specified at once, or successively. Thus, the approach of selecting an object before an action allows multiple objects to easily be applied with one or more actions.

After an object is specified at step 202 of FIG. 2A, additional signals are accepted from a user input device to select an action to apply to the object. Actions can be selected in many ways. For example, actions can be selected in the same way that objects are specified, above, if the action is visually indicated on the display screen. Ways to visually indicate an action on the display screen include showing node images, icons, lists of action names, etc.

After an action is selected, step 206 is executed to choose a destination. The destination can be by default—in which case there is no active step to choose the destination. For example, the destination can be the same location as the object. In other words, if the object is a clip stored on a disk, the destination can be to the same disk location to overwrite the original clip. Usually, the destination is preferably a different location in the same storage device as the original object, although any destination is possible. The user can specify a device destination as the default. For example, remote storage such as a redundant array of inexpensive disks (RAID) can be used over a network such as a local-area network (LAN) or the Internet.

After the object, action and destination have been obtained, the routine of flowchart 200 exits so that the system can perform the object-action process as directed.

Figure 2B:
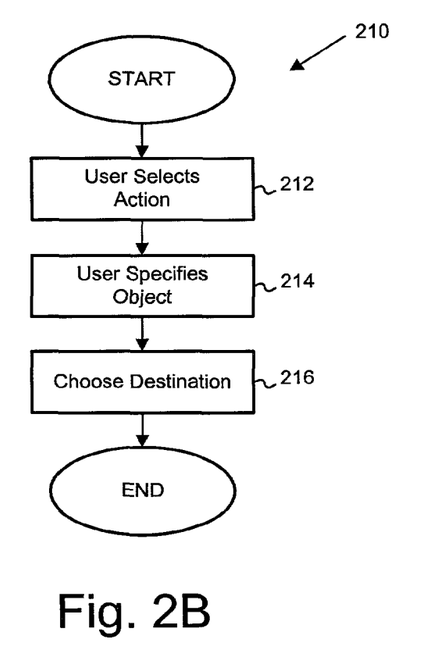
FIG. 2B shows flowchart to illustrate basic steps of a routine to perform action/object processing.

FIG. 2B shows flowchart 210 to illustrate basic steps of a routine to perform action/object processing.

In FIG. 2B, Step 212 accepts signals from a user input device to select an action. Next step 214 allows user specification of an object (or objects). This differs from the flowchart in FIG. 2A in that an action is selected before an object. This allows several actions to be pre-selected for application to a single object. Also, the pre-selected actions can be applied repeatedly to different objects. Similar to the flowchart of FIG. 2A, a destination is chosen at step 216.

Figure 2C:
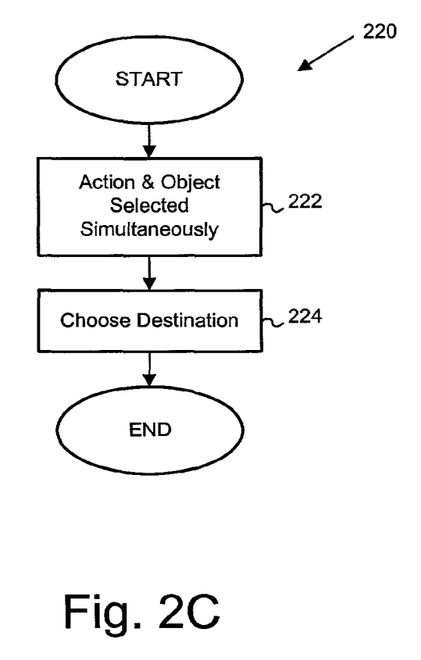
FIG. 2C shows a flowchart illustrating basic steps of a routine to perform gestural processing.

FIG. 2C shows flowchart 220 to illustrate basic steps of a routine to perform gestural processing.

In FIG. 2C, step 222 is executed to allow simultaneous, or single-action, selection of both an object and an action. One approach is to allow a user to "draw" on top of a displayed object. A single character, or symbol, is interpreted as a "gesture" to determine the type of action to apply. For example, drawing a "C" on the image of a frame object on the display indicates that a color correction operation is to be performed on the frame object. Many other types of distinguishable symbols can be used to indicate other actions. Similarly, where an object ID is drawn onto a visual indication of an operation (e.g., onto a "node" displayed on the display device) then the object becomes the subject of the action written upon. Step 224 is executed to choose a destination, if necessary, similar to the above.

FIGS. 3A-D show the quad viewing mode of the present invention.

Figure 3A:
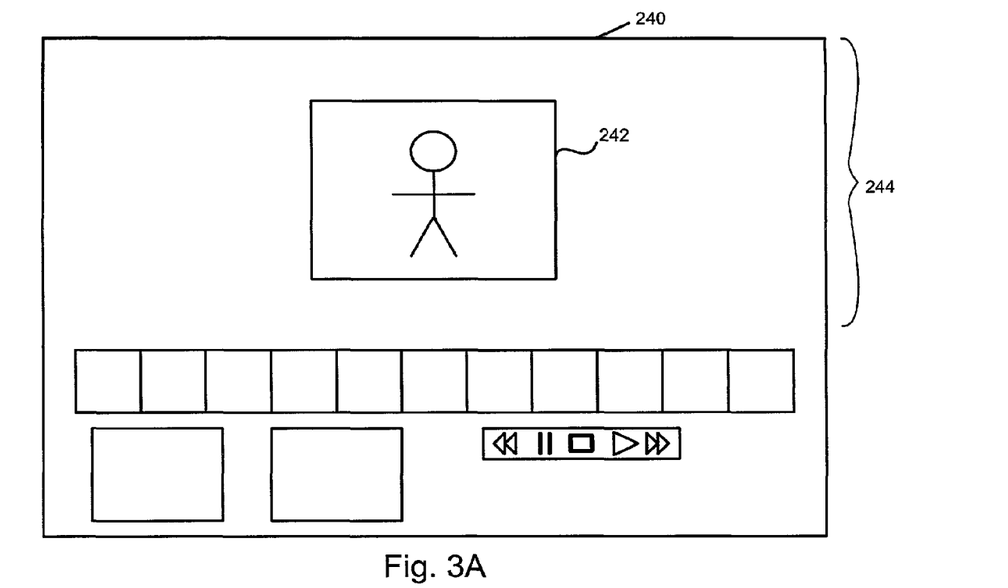
FIG. 3A shows a main window in a working panel of an image processing system.

In FIG. 3A, screen display 240 shows main image window 242 occupying upper panel area 244. Although a user will often work with a single main window as shown in FIG. 3A, a "quad" viewing and drawing mode is provided where four instances of an image are shown in four different adjacent windows.

Figure 3B:
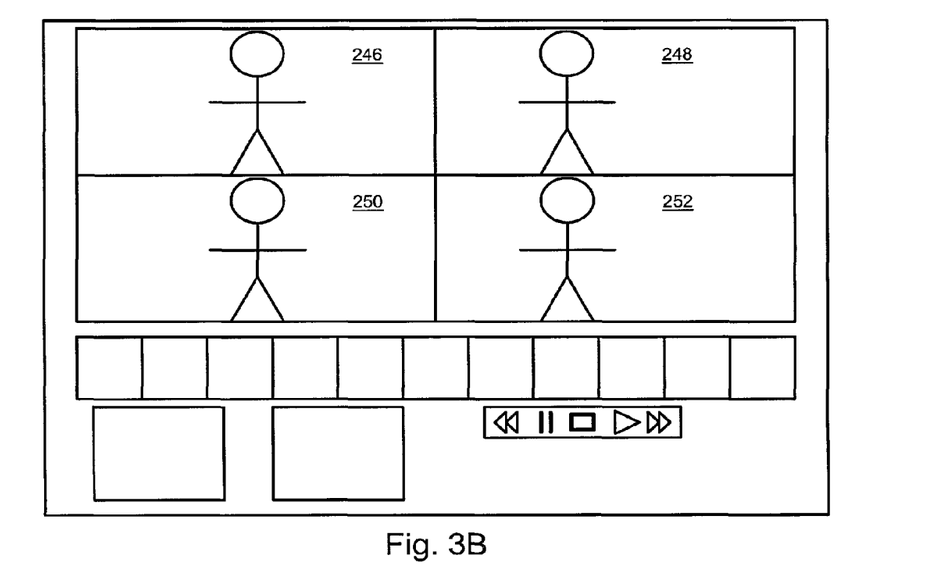
FIG. 3B illustrates the use of multiple windows.

FIG. 3B illustrates four windows 246, 248, 250 and 252 that fill the upper panel area. The four instances of the same image are useful to view different areas of the image simultaneously to determine whether a desired effect has been achieved with any applied operations. Each window can be panned and zoomed independently. Windows can also be resized independently.

Figure 3C:
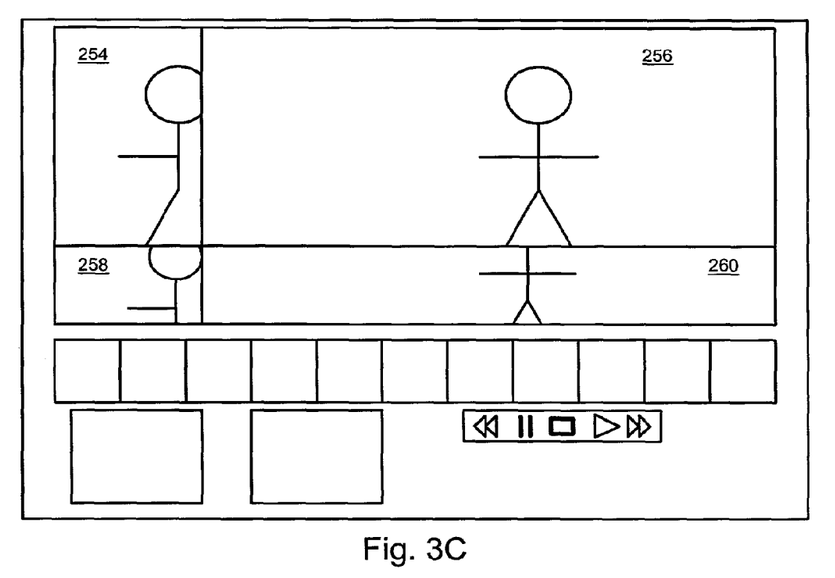
FIG. 3C shows the effect of resizing four windows.

FIG. 3C shows the effect of resizing the four windows of FIG. 3B.

In FIG. 3C, window 254 has been shortened by moving its right boundary to the left. This results in an expansion of window 256 to the left. Window 256 has also been expanded downwards at the expense of windows 258 and 260. Note that the movement of the window boundaries results in a clipping of the image in the bounded window.

Figure 3D:
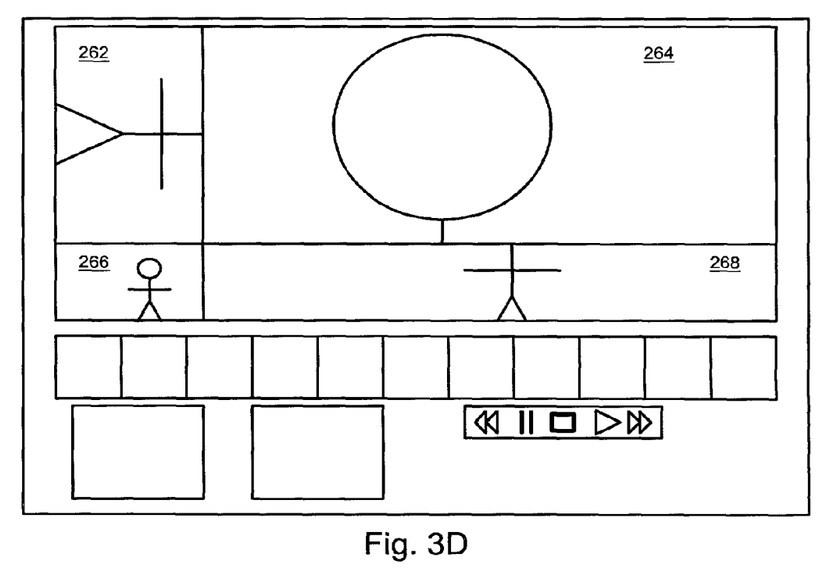
FIG. 3D illustrates the effect of scaling, rotating and panning operations in the windows.

In FIG. 3D, different scaling, rotating and panning operations have been performed from FIG. 3C in order to show different results in each window. The image in window 262 has been rotated. The image in window 264 has been scaled up (i.e., zoomed in). The image in window 266 has been scaled down. The image in window 268 remains the same as the image in window 260 of FIG. 3C.

Throughout all of the independent window and image manipulations, each image in the quad view is processed with any operations and effects in the same way. In other words, the bitmap representations of the content of each window is the same except for the viewing operations—which do not affect the image content. Thus, the user is provided with a convenient way to view the image simultaneously at different scales. The user can view effects in a very small area and also view the larger picture to see the image to the full scale, as it would appear in the final production. Naturally, any number of windows can be provided.

A navigator drawing mode provides a small "wide-area" indicator to help a user determine what portion of a larger image or diagram is being viewed on the display screen.

Figure 4A:
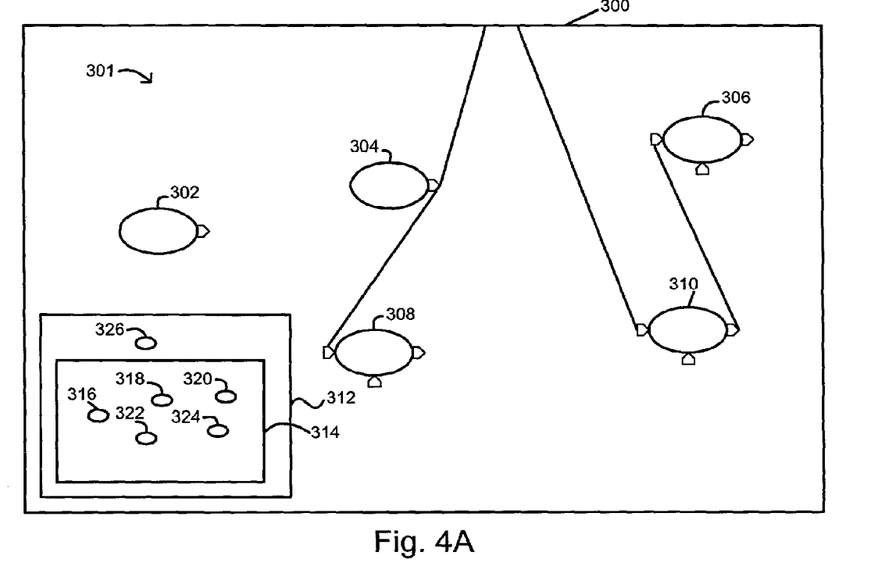
FIG. 4A illustrates navigator viewing as applied to viewing a relatively large flowgraph.

FIG. 4A illustrates navigator viewing as applied to viewing a relatively large flowgraph.

In FIG. 4A, display screen 300 shows flowgraph portion 301 including nodes 302, 304, 306, 308 and 310; with various connectors to connect nodes shown in the display screen and nodes off-screen (not shown). As is apparent from FIG. 4A, not all of the flowgraph is shown in display screen 300.

Navigator box 312 includes miniature representation 314 of display screen 300. Miniature representation, or "mini screen," 314 includes the major items that can be seen on display screen 300. Namely, the nodes of visible flowgraph portion 301 are shown on the mini screen as 316, 318, 320, 322 and 324, respectively. Note that node 326 which is shown in navigator box 312 but not in mini screen 314 is an item that is part of the larger flowgraph diagram but which is not visible on display screen 300. Thus, the user can tell from the navigator box that scrolling the display screen view upwards will bring another node, corresponding to node 326, within view.

Navigator box 312 is preferably large enough to include viewing space around all four sides of mini screen 314 so that the user can effectively see what will come into view if the display screen view is scrolled in different directions.

Figure 4B:
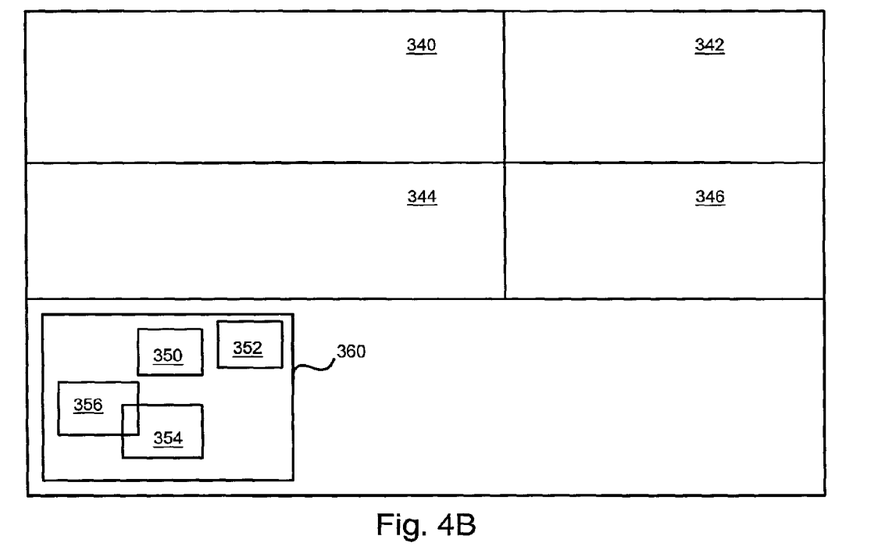
FIG. 4B shows navigator and multiple window viewing.

Another feature of the present invention combines the navigator view with the quad view as shown in FIG. 4B.

In FIG. 4B, windows 340, 342, 344 and 346 provide the quad view as described above. Navigator box 360 now shows four mini screens to correspond with each of the windows. Unlike the discussion above for quad views, the four windows of FIG. 4B are now used to view four different parts of a diagram so their image content is not the same.

The four different parts of a larger diagram are shown relative to each other in the diagram as mini windows 350, 352, 354 and 356 corresponding with windows 340, 342, 344 and 346, respectively. As each window is scrolled, zoomed, etc., the corresponding mini window is changed accordingly and the navigator box is manipulated to accommodate the display of all four mini windows.

The present invention uses the intersection of effects within a common group to determine the effective start/stop points to apply an effect.

Figure 5A:
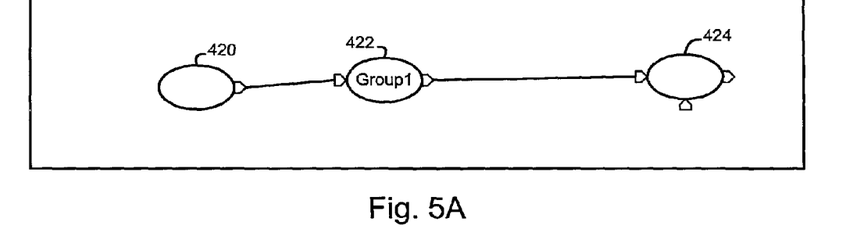
FIG. 5A shows a flowgraph including a group node.

FIG. 5A shows a flowgraph where group node 422, called "Group1," is connected between nodes 420 and 424.

Figure 5B:
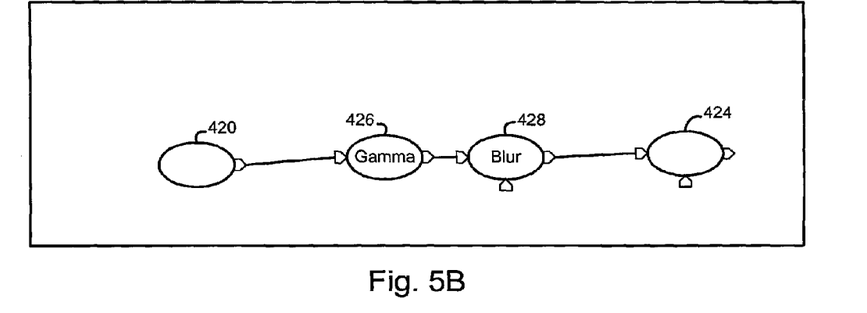
FIG. 5B shows the result of expanding a group node.

FIG. 5B shows the result of expanding Group1 into its group nodes, or sub-nodes. Group nodes "Gamma" and "Blur" are now connected between nodes 420 and 424. Each node can be assigned a start and stop time to designate the bounds in which the node's effect, or operation, will be applied to a clip.

Figure 5C:
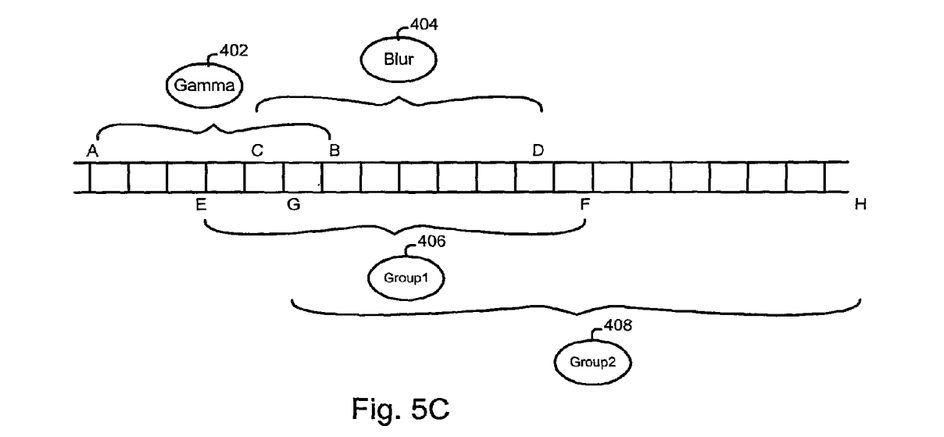
FIG. 5C illustrates start and stop times of operations in a group.

FIG. 5C further illustrates start and stop times of group nodes.

In FIG. 5C, clip 400 has three different operations, or effects, applied to the clip at different times. Each effect has a start and stop point, also referred to as "mark in" and "mark out" points. Effects are also referred to, and represented by, nodes.

In FIG. 5C, Gamma node 402 is an effect that starts at frame A and ends at frame B. Blur node 404 is an effect that starts at frame C and ends at frame D. A feature of the present invention allows any number of nodes to be "grouped" into another common node. When grouped, all nodes in the group are connected and disconnected in accordance with the single group node's connections on a flowgraph that includes the group node. Group nodes can also be present within other group nodes. Each group node can have its own start and stop points. The clip section between a node's start and stop points is the active area for the node's operation.

A preferred embodiment of the invention uses the intersection of overlapping active areas to determine the active area for a sub-nodes of a group. In the example of FIG. 5C, Group1's active area is E-F. However, Gamma node 402's active area is E-B. This is only a portion of Gamma node 402's active area, A-B, were it not part of Group1. In other words, each sub-node's active area is the intersection, or overlap, of the sub-node's active area with the group node's active area. Blur node 404's active area remains C-D which is the full extent of Blur node 404's active area even as a standalone (i.e., not part of a group) node since all of Blur node 404's standalone active area is within the active area of Group 1.

To further illustrate. If Group1 node is later made part of Group2, then all of the active areas are now intersected with Group2's active area, G-H, in order to obtain the nodes' active areas as part of Group2. Namely, Gamma node 402's active area in Group2 is G-B and Blur node 404's active area in Group2 is G-D. Group1's active area while in Group2 is G-F.

Basic Hardware

FIGS. 1D and 1E illustrate basic hardware components suitable for practicing the present invention.

FIG. 1D is an illustration of computer system 1 including display 3 having display screen 5. Cabinet 7 houses standard computer components (not shown) such as a disk drive, CDROM drive, display adapter, network card, random access memory (RAM), central processing unit (CPU), and other components, subsystems and devices. User input devices such as mouse 11 having buttons 13, and keyboard 9 are shown. Other user input devices such as a trackball, touchscreen, digitizing tablet, etc. can be used. Other media presentation devices other than display screen 5 may be used such as projection displays, wearable computer monitor (e.g., "dataglass"), etc. In general, the computer system is illustrative of but one type of computer system, such as a desktop computer, suitable for use with the present invention. Computers can be configured with many different hardware components and can be made in many dimensions and styles (e.g., laptop, palmtop, pentop, server, workstation, mainframe). Any hardware platform suitable for performing the processing described herein is suitable for use with the present invention.

FIG. 1E illustrates subsystems that might typically be found in a computer such as computer 1.

In FIG. 1E, subsystems within box 20 are directly interfaced to internal bus 22. Such subsystems typically are contained within the computer system such as within cabinet 7 of FIG. 4A. Subsystems include input/output (I/O) controller 24, System Memory (or random access memory "RAM") 26, central processing unit CPU 28, Display Adapter 30, Serial Port 40, Fixed Disk 42, Network Interface Adapter 44. The use of bus 22 allows each of the subsystems to transfer data among subsystems and, most importantly, with the CPU. External devices can communicate with the CPU or other subsystems via bus 22 by interfacing with a subsystem on the bus. Thus, Monitor 46 connects with Display Adapter 30, a relative pointing device (e.g. a mouse) connects through Serial Port 40. Some devices such as Keyboard 50 can communicate with the CPU by direct means without using the main data bus as, for example, via an interrupt controller and associated registers.

As with the external physical configuration shown in FIG. 1D, many subsystem configurations are possible. FIG. 1E is illustrative of but one suitable configuration. Subsystems, components or devices other than those shown in FIG. 1E can be added. A suitable computer system can be achieved without using all of the subsystems shown in FIG. 1E. For example, a standalone computer need not be coupled to a network so Network Interface 44 would not be required. Other subsystems such as a CDROM drive, graphics accelerator, etc. can be included in the configuration without affecting the performance of the system of the present invention.

Any suitable programming language can be used to implement the routines of the present invention including C, C++, Java, assembly language, etc. Different programming techniques can be employed such as procedural or object oriented. The routines can execute on a single processing device or multiple processors. Although the flowchart format demands that the steps be presented in a specific order, this order may be changed. Multiple steps can be performed at the same time. The flowchart sequence can be interrupted. The routines can operate in an operating system environment or as stand-alone routines occupying all, or a substantial part, of the system processing.

Steps can be performed by hardware or software, as desired. Note that steps can be added to, taken from or modified from the steps in the flowcharts presented in this specification without deviating from the scope of the invention. In general, the flowcharts are only used to indicate one possible sequence of basic operations to achieve a functional aspect of the present invention.

Although the present invention is described predominantly with respect to a visual image processing system, many types of systems that include media presentation features can employ the present invention. Such systems include, but are not limited to, audio, animation, modeling, computer-aided design, web browsing or access, etc. Other embodiments need not devote screen area to specific controls, such as the controls at 114 of FIG. 1A. It should be apparent that the entire screen, or different portions of the screen, can be used for media presentation and parameter modification as described herein.

Although the invention has been discussed in connection with parameters and parameter values, other structures for modifying media instances, such as attribute/value pairs, arrays, lists, etc., can be employed. In general, a parameter, or other data structure, used to describe an image need not only have a single value. Multiple values, data structures, functions, etc., can be used to define parameter values either continuously or discretely. For example, where a function is used to define parameter values over space, time, etc., the present invention can check for different functions associated with shared parameter types as opposed to merely checking for different values, as described above.

Thus, the scope of the invention is to be determined solely by the appended claims.

What is claimed is:

1. A method for modifying an image in an electronic video editing system, the method executing in a computer system including one or more processors coupled to at least one user input device and to a display screen, the method comprising the following acts performed by the one or more hardware processors:
    displaying four windows on the display screen, wherein the windows are adjacent to each other and placed in an upper-left, upper-right, lower-left and lower-right arrangement to form a set of four windows, wherein the set of four windows has a size defined by the outer edge boundaries of the set; and wherein any one of the four windows can be panned and/or zoomed independently of any other one of the four windows;
    accepting a signal from the at least one user input device to select an image in a video sequence for editing;
    displaying one instance of the selected image in a first of the four windows at a first zoom level;
    accepting signals from the at least one user input device to show a second instance of the selected image, the second instance consisting of a portion of the selected image at a second zoom level in a second of the four windows;
    accepting signals from the at least one user input device to modify the selected image; and
    updating the first and second instances of the selected image in the first and second windows, respectively, to show the modification of the selected image simultaneously in the first and second windows at the first and second zoom levels, respectively.

2. The method of claim 1, further comprising:
    accepting a signal from the at least one user input device to modify a size of one of the four windows; and
    modifying one or more of the unmodified windows so that the size of the set of four windows remains constant.

3. A method for modifying an image in an electronic video editing system, the method executing in a computer system including one or more processors coupled to at least one user input device and to a display screen, the method comprising the following acts performed by the one or more hardware processors:
    accepting signals from the at least one user input device to cause a display of two or more windows on the display screen, wherein any one of the two or more windows can be panned and/or zoomed independently of any other one of the two or more windows;
    accepting a signal from the at least one user input device to select an image in a video sequence for editing;
    accepting signals from the at least one user input device to set a first view of the selected image in a first one of the two or more windows;
    accepting signals from the at least one user input device to set a second view of the selected image in a second one of the two or more windows;
    accepting signals from the at least one user input device to perform an operation to modify the selected image; and
    updating the first and second views in the first and second windows, respectively, to show the modification of the selected image simultaneously in the first and second windows.

4. The method of claim 3, wherein the operation includes a brightness adjustment.

5. The method of claim 3, wherein the operation includes a clamp effect.

6. The method of claim 3, wherein the operation includes a contrast change.

7. The method of claim 3, wherein the operation includes converting one or more pixel values.

8. The method of claim 3, wherein the operation includes cropping.

9. The method of claim 3, wherein the operation includes a dissolve.

10. The method of claim 3, wherein the operation includes a fade.

11. The method of claim 3, wherein the operation includes a gain adjustment.

12. The method of claim 3, wherein the operation includes a gamma adjustment.

13. The method of claim 3, wherein modifying includes changing the vertical size of a window.

14. The method of claim 3, wherein modifying includes changing the horizontal size of a window.

15. The method of claim 3, wherein modifying includes changing the zoom scale of a window.

16. The method of claim 3, wherein modifying includes rotating a view of the selected image.

17. The method of claim 3, further comprising:
displaying four windows on the display screen, wherein the windows are adjacent to each other and placed in an upper-left, upper-right, lower-left and lower-right arrangement to form a set of four windows, wherein the set of four windows has a size defined by the outer edge boundaries of the set;
accepting a signal from the at least one user input device to modify a size of one of the four windows; and
modifying one or more of the unmodified windows so that the size of the set of four windows remains constant.

18. An apparatus for modifying an image in an electronic video editing system, the apparatus comprising:
one or more processors
a display coupled to the one or more processors;
at least one user input device coupled to the one or more processors;
a processor-readable storage device including instructions executable by the one or more processors for:
accepting signals from the at least one user input device to cause a display of two or more windows on the display screen, wherein any one of the two or more windows can be panned and/or zoomed independently of any other one of the two or more windows;
accepting a signal from the at least one user input device to select an image in a video sequence for editing;
accepting signals from the at least one user input device to set a first view of the selected image in a first one of the two or more windows;
accepting signals from the at least one user input device to set a second view of the selected image in a second one of the two or more windows;
accepting signals from the at least one user input device to perform an operation to modify the selected image; and
updating the first and second views in the first and second windows, respectively, to show the modification of the selected image simultaneously in the first and second windows.

19. A processor-readable storage device including one or more instructions executable by one or more processors for modifying an image in an electronic video editing system, the processor-readable storage device including one or more instructions for:
accepting signals from the at least one user input device to cause a display of two or more windows on a display screen, wherein any one of the two or more windows can be panned and/or zoomed independently of any other one of the two or more windows;
accepting a signal from at least one user input device to select an image in a video sequence for editing;
accepting signals from the at least one user input device to set a first view of the selected image in a first one of the two or more windows;
accepting signals from the at least one user input device to set a second view of the selected image in a second one of the two or more windows;
accepting signals from the at least one user input device to perform an operation to modify the selected image; and
updating the first and second views in the first and second windows, respectively, to show the modification of the selected image simultaneously in the first and second windows.

* * * * *